United States Patent
Tanabe et al.

(10) Patent No.: US 11,537,956 B2
(45) Date of Patent: Dec. 27, 2022

(54) RIDE-SHARE SUPPORT SYSTEM AND RIDE-SHARE SUPPORT METHOD

(71) Applicant: HONDA MOTOR CO., LTD., Tokyo (JP)

(72) Inventors: Hiroyuki Tanabe, Wako (JP); Takuma Mori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 88 days.

(21) Appl. No.: 17/124,884

(22) Filed: Dec. 17, 2020

(65) Prior Publication Data

US 2021/0201215 A1    Jul. 1, 2021

(30) Foreign Application Priority Data

Dec. 25, 2019   (JP) .............................. JP2019-234869

(51) Int. Cl.
| | |
|---|---|
| *G06Q 10/02* | (2012.01) |
| *G06Q 50/30* | (2012.01) |
| *H04W 4/02* | (2018.01) |
| *H04W 4/021* | (2018.01) |

(52) U.S. Cl.
CPC .............. *G06Q 10/02* (2013.01); *G06Q 50/30* (2013.01); *H04W 4/021* (2013.01); *H04W 4/023* (2013.01)

(58) Field of Classification Search
CPC ....... G06Q 10/02; G06Q 50/30; H04W 4/021; H04W 4/023
USPC .......................................................... 705/5
See application file for complete search history.

(56) References Cited

U.S. PATENT DOCUMENTS

| | | | | |
|---|---|---|---|---|
| 2019/0370922 A1* | 12/2019 | Asghari | ............... | G06Q 10/067 |
| 2019/0370924 A1* | 12/2019 | Kassner | ............... | G06Q 10/047 |

FOREIGN PATENT DOCUMENTS

| | | |
|---|---|---|
| JP | 2012-037402 | 2/2012 |
| JP | 2014-178259 | 9/2014 |

OTHER PUBLICATIONS

"Minimizing the Driving Distance in Ride Sharing Systems" Published by IEEE (Year: 2014).*

* cited by examiner

*Primary Examiner* — Zeina Elchanti
(74) *Attorney, Agent, or Firm* — Rankin, Hill & Clark LLP

(57) ABSTRACT

A ride-share support system includes a getting-on/getting-off point information acquiring unit configured to acquire first getting-on/getting-off point information including a getting-on point or a getting-off point of a first ride-share applicant and second getting-on/getting-off point information including a getting-on point or a getting-off point of a second ride-share applicant, a getting-on/getting-off point distance calculating unit configured to calculate a distance between getting-on/getting-off points which is a distance between the getting-on point or the getting-off point of the first ride-share applicant and the getting-on point or the getting-off point of the second ride-share applicant, and a ride-share matching unit configured to determine ride-sharers of a vehicle by matching a plurality of ride-share applicants while excluding combination of the first ride-share applicant and the second ride-share applicant in a case where the distance between getting-on/getting-off points is equal to or less than a predetermined distance.

8 Claims, 8 Drawing Sheets

FIG.5

| USER ID | HOME POINT | DESIRED ROLE | DEPARTURE PLACE | DESTINATION | DATE AND TIME OF DEPARTURE | RIDE-SHARE GROUP |
|---|---|---|---|---|---|---|
| UID-001 | H1 | DRIVER | P1 | Pg | 2020.2.1 AM8:00 | SG1(DRIVER) |
| UID-002 | H2 | RIDER | P2 | Pg | 2020.2.1 AM8:10 | SG1(RIDER) |
| UID-003 | H3 | RIDER | P3 | Pg | 2020.2.1 AM8:15 | EXCLUDED |
| UID-004 | H4 | RIDER | P4 | Pg | 2020.2.1 AM8:20 | SG1(RIDER) |
| UID-005 | H5 | RIDER | P5 | Pg | 2020.2.1 AM8:25 | SG1(RIDER) |

[RIDE-SHARE OPERATION SCHEDULE]

8:00　FIRST USER (DRIVER) DEPARTS,
　　　DEPARTURE POINT: P1

8:10　SECOND USER (RIDER) JOINS,
　　　GETTING-ON POINT: P2

8:20　FOURTH USER (RIDER) JOINS,
　　　GETTING-ON POINT: P4

8:25　FIFTH USER (RIDER) JOINS,
　　　GETTING-ON POINT: P5

8:40　ARRIVE AT DESTINATION,
　　　DESTINATION POINT: Pg

RIDE-SHARE SUPPORT SYSTEM AND RIDE-SHARE SUPPORT METHOD

INCORPORATION BY REFERENCE

The present application claims priority under 35 U.S.C. § 119 to Japanese Patent Application No. 2019-234369 filed on Dec. 25, 2015. The content of the application is incorporated herein by reference in its entirety.

BACKGROUND OF THE INVENTION

Field of the Invention

The present invention relates to a ride-share support system and a ride-share support method.

Description of the Related Art

In related art, a log information disclosure system has been proposed which is configured to, in a case where a transport route which passes through a private area of a user is included in log information posted from the user, disclose a transport route which has been changed to avoid the private area (see, for example, Japanese Patent Laid-Open No. 2014-178259 and Japanese Patent Laid-Open No. 2012-37402).

As a service accompanied by disclosure of route information and position information provided from a user as in the above-described log information disclosure system, a ride-share matching service is provided. In the ride-share matching service, a provider of transport using a vehicle discloses information of a departure place and a destination, and a getting-on applicant who desires to get on the vehicle discloses information of a getting-on point and a getting-off point. Then, by the disclosed departure, place and destination, and the getting-on point and the getting-off point of the provider of transport using the vehicle and the getting-on applicant being confirmed, and a ride-sharer who suits desired conditions being picked up, a ride-sharer who is to get on the vehicle is determined.

However, if a departure place, a destination, a getting-on point and a getting-off point of the vehicle in ride-share are disclosed in this manner, there is a concern that location information of a private area such as a home of a ride-sharer will become known to others.

The present invention has been made in view of such background, and an object of the present invention is to provide a ride-share support system and a ride-share support method which are capable of preventing location information of a private area of a ride-sharer of a vehicle from being known to other ride-sharers.

SUMMARY OF THE INVENTION

A first aspect for achieving the above-described object is a ride-share support, system which supports matching of a plurality of ride-share applicants who desire ride-share of a vehicle, the ride-share support system including a getting-on/getting-off point information acquiring unit configured to acquire first getting-on/getting-off point information including information of at least one of a getting-on point and a getting-off point in the ride-share of a first ride-share applicant transmitted from a first applicant terminal to be used by the first ride-share applicant, and second getting-on/getting-off point information including information of at least one of a getting-on point and a getting-off point in the ride-share of a second ride-share applicant transmitted from a second applicant terminal to be used by the second ride-share applicant, for the first ride-share applicant and the second ride-share applicant who are each one of a plurality of ride-share applicants, a getting-on/getting-off point distance calculating unit configured to calculate a distance between getting-on/getting-off points which is a distance between the getting-on point or the getting-off point in the ride-share of the first ride-share applicant and the getting-on point or the getting-off point in the ride-share of the second ride-share applicant based on the first getting-on/getting-off point information and the second getting-on/getting-off point information, and a ride-share matching unit configured to determine ride-sharers of the vehicle by matching a plurality of the ride-share applicants while excluding combination of the first ride-share applicant and the second ride-share applicant in a case where the distance between getting-on/getting-off points is equal to or less than a predetermined distance.

In the above-described ride-share support system, the ride-share matching unit may match a plurality of the ride-share applicants without excluding combination of the first ride-share applicant and the second ride-share applicant even if the distance between getting-on/getting-off points is equal to or less than the predetermined distance, in a case where none of the getting-on point or the getting-off point in the ride-share of the first ride-share applicant and the getting-on point or the getting-off point in the ride-share of the second ride-share applicant, which are used to calculate the distance between getting-on/getting-off points, is located within a private area of the first ride-share applicant or the second ride-share applicant.

The above-described, ride-share support system may include a vehicle position recognizing unit configured to recognize a position of the vehicle, and a vehicle position information providing unit configured to transmit vehicle position information indicating the position of the vehicle recognized by the vehicle position recognizing unit to ride-sharer terminals to be used by the ride-sharers of the vehicle matched by the ride-share matching unit.

The above-described ride-share support system may include a vehicle position notification prohibiting unit configured to prohibit notification of the position of the vehicle based on the vehicle position information at the ride-sharer terminals of other ride-sharers when the position of the vehicle recognized by the vehicle position recognizing unit is located within a private area of one of a plurality of the ride-sharers.

In the above-described ride-share support system, an area in which at least one of a home, an office, a school and a hospital of the ride-share applicant is located may be set as the private area of the ride-share applicant.

A second aspect for achieving the above-described object is a ride-share support method to be executed by a ride-share support system which supports matching of a plurality of ride-share applicants who desire ride-share of a vehicle, the ride-share support method including a getting-on/getting-off point information acquiring step of acquiring first getting-on/getting-off point information including information of at least one of a getting-on point and a getting-off point in the ride-share of a first ride-share applicant transmitted from a first applicant terminal to be used by the first ride-share applicant, and second getting-on/getting-off point information including information of at least one of a getting-on point and a getting-off point in the ride-share of a second ride-share applicant transmitted from a second applicant terminal to be used by the second ride-share applicant, for the first, ride-share applicant and the second ride-share applicant who are each one of a plurality of the ride-share applicants, a getting-on/getting-off point distance calculating step of calculating a distance between getting-on/getting-off points which is a distance between the getting-on point or the getting-off point in the ride-share of the first ride-share applicant and the getting-on point or the getting-off point in the ride-share of the second ride-share applicant based on the first getting-on/getting-off point information and the second getting-on/getting-off point information, and a ride-share matching step of determining ride-sharers of the vehicle by matching a plurality of the ride-share applicants while excluding combination of the first ride-share applicant and the second ride-share applicant in a case where the distance between getting-on/getting-off points is equal to or less than a predetermined distance.

In the above-described ride-share support system, it is assumed that the first ride-share applicant and the second ride-share applicant set the getting-on points and the getting-off points of the first getting-on/getting-off point information and the second getting-on/getting-off point information within private areas such as vicinities of homes in consideration of reduction of their burden in moving by foot, or the like. Therefore, if a distance between the getting-on point or the getting-off point of the first ride-share applicant and the getting-on point or the getting-off point of the second ride-share applicant is short, the getting-on points or the getting-off points of both of the first ride-share applicant and the second ride-share applicant are highly likely to be set within overlapping private areas of the first ride-share applicant and the second ride-share applicant.

Further, in a case where the getting-on points or the getting-off points of both of the first ride-share applicant and the second ride-share applicant are set within the overlapping private areas of the first ride-share applicant and the second ride-share applicant in this manner, there is a possibility that, when the first ride-share applicant recognizes the second ride-share applicant who gets on or gets off the vehicle within the private area of the first ride-share applicant, with which the first ride-share applicant is familiar, location information of the private area of the second ride-share applicant may be known to the first ride-share applicant. In a similar manner, there is a possibility that, when the second ride-share applicant recognizes the first ride-share applicant who gets on or gets off the vehicle within the private area of the second ride-share applicant, with which the second ride-share applicant is familiar, location information of the private area of the first ride-share applicant may be known to the second ride-share applicant.

Therefore, the ride-share support system of the aspects of the present invention excludes the first ride-share applicant and the second ride-share applicant who desire ride-share of the vehicle from combination of matching by the ride-share matching unit in a case where the distance between getting-on points or the getting-off points is equal to or less than a predetermined distance. By this means, it is possible to prevent location information of a private area of a ride-sharer from being known to other ride-sharers as a result of the first ride-share applicant and the second ride-share applicant whose getting-on points or getting-off points of the vehicle for ride-share are close to each other being matched.

BRIEF DESCRIPTION OF THE DRAWINGS

FIG. 5 is an explanatory diagram of a reservation application list;

FIG. 6 is an explanatory diagram of a ride-share operation schedule;

DETAILED DESCRIPTION OF THE PREFERRED EMBODIMENT

1. Explanatory Diagram of Aspect where Ride-Share is Matched by Ride-Share Support System An aspect where ride-share is supported by a ride-share support system 1 of the present embodiment will be described with reference to FIG. 1.

Figure 1:
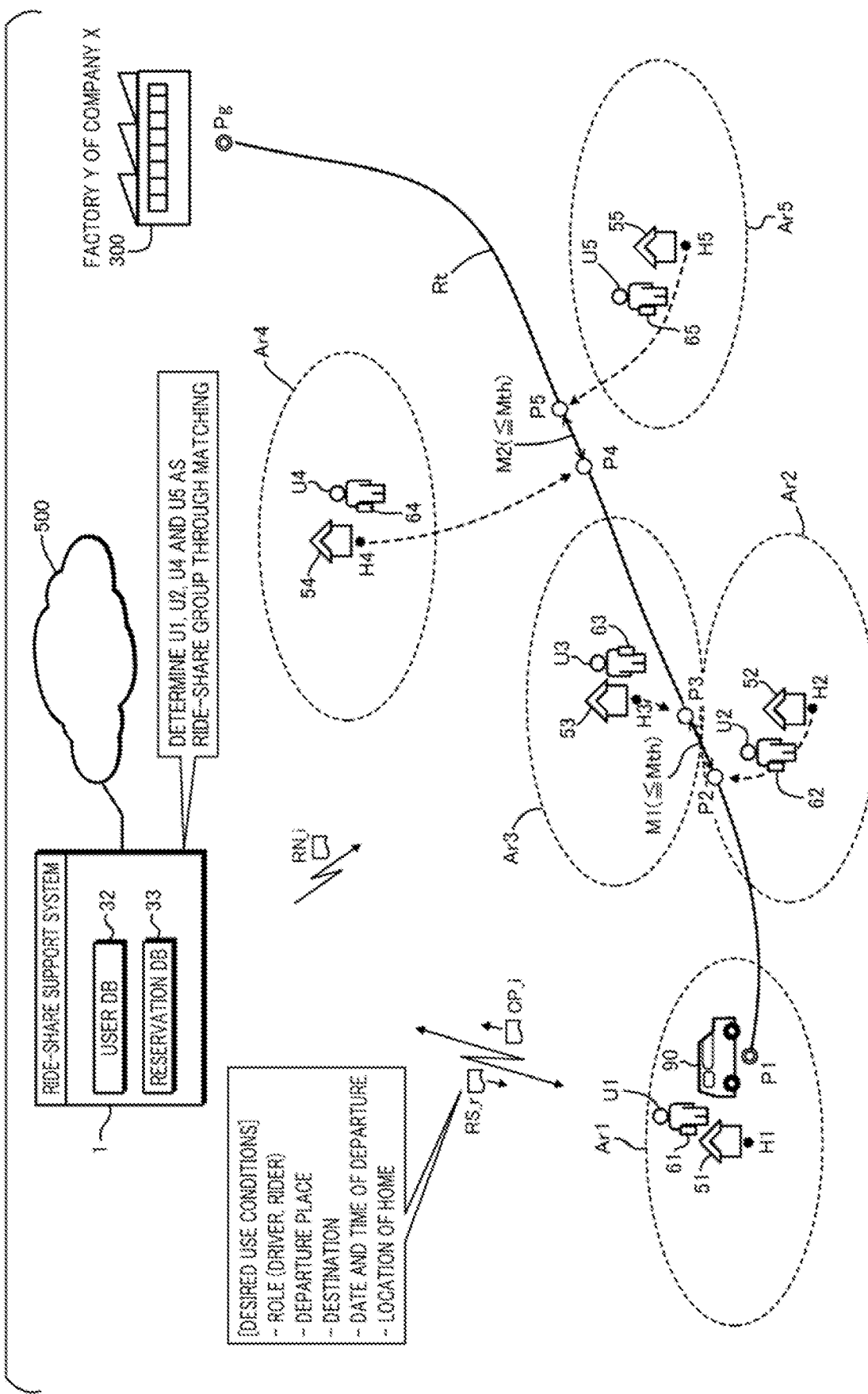
FIG. 1 is an explanatory diagram of an aspect where ride-share is supported by a ride-share support system.

FIG. 1 illustrates an aspect where the ride-share support system 1 performs matching of ride-share of a vehicle 90 to a location Pg of factory Y of company X 300 which is a common destination point for five users of a first user U1, a second user U2, a third user U3, a fourth user U4 and a fifth user U5. The ride-share support system 1 performs communication with mobile terminals 61 to 65 to be respectively used by the first user U1 to the fifth user U5 via a communication network 500.

The first user U1 to the fifth user U5 reserve ride-share by executing ride-share application using the mobile terminals 61 to 65 and transmitting reservation application information RS_r including desired ride-share use conditions to the ride-share support system 1. FIG. 1 illustrates an example where the first user U1 transmits the reservation application information RS_r. The ride-share support system 1 receives the reservation application information RS_r transmitted from the mobile terminals 61 to 65 of the first user U1 to the fifth user U5 and stores the reservation application information RS_r in a user DB (database) 32. The first user U1 to the fifth user U5 who apply a reservation of ride-share in this manner correspond to ride-share applicants of the present invention.

The reservation application information RS_r includes a role, a departure place, a destination, date and time of departure and a location of a home as the ride-share use conditions. The role is a driver who provides a vehicle for ride-share and drives to a destination, or a rider who rides a vehicle for ride-share together. Note that it is also possible to allow a user to designate that the user can play either role of a driver and a rider. In this case, for example, matching is performed while priority is given to a role as a driver.

The departure place is a getting-on point at which the user starts transport using the vehicle for ride-share for a driver, and is a getting-on point at which the user gets on the vehicle for ride-share which is headed to a destination for a rider. The destination is a point at which the user finishes transport using the vehicle for ride-share for a driver, and is a getting-off point at which the user gets off the vehicle for ride-share for a rider. The date and time of departure is date and time at which the user starts transport using the vehicle for ride-share for a driver, and is date and time at which the user gets on the vehicle tor ride-share at the getting-on point for a rider.

The location of the home is used for setting a private area of each user, and the ride-share support system 1 sets, for example, a range with a radius of approximately 200 meters from the location of the home as the private area. In FIG. 1, a private area Ar1 centering around a location H1 of the home 51 of the first user U1 is set for the first user U1.

In a similar manner, a private area Ar2 centering around a location H2 of the home 52 of the second user U2 is set for the second user U2, and a private area Ar3 centering around a location H3 of the home 53 of the third user U3 is set. Further, a private area Ar4 centering around a location H4 of the home 54 of the fourth user U4 is set for the fourth user U4, and a private area Ar5 centering around a location H5 of the home 55 of the fifth user U5 is set for the fifth user U5.

The ride-share support system 1 determines a ride-share group of getting on the vehicle 90 by performing matching in view of the following points to avoid information of areas in which the homes 51 to 55 are located which is private information of the first user U1 to the fifth user U5 from being known to other users. In other words, the ride-share support system 1 confirms whether or not there is combination (prohibited combination) of users who desire two adjacent departure points or getting-on points which satisfy the following condition 1 and condition 2 as departure points P1 and getting-on points P2 to P5 of the first user U1 to the fifth user U5 on a ride-share operation route Rt.

Condition 1: a distance between getting-on/getting-off points M which is a distance between the two adjacent getting-on points is equal to or less than a predetermined distance Mth. The predetermined distance Mth is set at, for example, approximately 200 meters.

Condition 2: at least one of two getting-on points which are used to calculate the condition 1 is located within ranges of the private areas Ar1 to Ar5.

Then, the ride-share support system 1 performs matching of ride-share while avoiding the prohibited combination in a case where there is prohibited combination. In an example in FIG. 1, the distance between getting-on/getting-off points M1 is equal to or less than the predetermined distance Mth for the getting-on points P2 and P3. Further, the getting-on point P2 is located within the private area Ar2 of the user U2, and the getting-on point P3 is located within the private area Ar3 of the user U3.

Therefore, because combination of the getting-on point P2 and the getting-on point P3 satisfies the above-described condition 1 and condition 2, if the second user U2 and the third user U3 are matched as ride-sharers of the vehicle 90, there is a possibility that locations of the homes are known to each other between the second user U2 and the third user U3. Therefore, the ride-share support system 1 performs matching of the ride-sharers while avoiding combination of the second user U2 and the third user U3 and determines the ride-sharers of the vehicle 90 while selecting only one of the second user U2 and the third user U3 or selects neither the second user U2 nor the third user U3.

Here, the second user U2 corresponds to a first ride-share applicant of the present invention, the mobile terminal 62 to be used by the second user U2 corresponds to a first applicant terminal of the present invention, and information of the second getting-on point P2 at which the second user U2 desires to get on the vehicle corresponds to first getting-on/getting-off point information of the present invention. Further, the third user U3 corresponds to a second ride-share applicant of the present invention, the mobile terminal 63 to be used by the third user U3 corresponds to a second applicant terminal of the present invention, and information of the third getting-on point P3 at which the third user U3 desires to get on the vehicle corresponds to second getting-on/getting-off point information of the present invention.

Further, in FIG. 1, because the distance between getting-on/getting-off points M2 is equal to or less than the predetermined distance Mth for the getting-on points P4 and P5, the above-described condition 1 is satisfied. However, because the getting-on points P4 and P5 are both located outside the ranges of the private areas Ar1 to Ar5, the above-described condition 2 is not satisfied. Therefore, the ride-share support system 1 sets the fourth user U4 and the fifth user U5 as targets for matching of ride-share.

In this manner, the ride-share support system 1 performs matching of ride-share from the departure point P1 to the destination point Pg using the vehicle 90, and matches the first user U1, the second user U2, the fourth user U4 and the fifth user U5 as the ride-share group while excluding the third user U3. Then, the ride-share support system 1 stores information of an operation schedule of the determined ride-share group in a reservation DB 33 and transmits reservation information including the operation schedule to the mobile terminal 61 of the first user U1, the mobile terminal 62 of the second user U2, the mobile terminal 64 of the fourth user U4 and the mobile terminal 65 of the fifth user U5.

Here, the mobile terminals 61, 62, 64 and 65 to be used by the first user U1, the second user U2, the fourth user U4 and the fifth user U5 which are ride-sharers of the vehicle 50 correspond to ride-sharer terminals of the present invention.

The first user U1 who drives the vehicle 90 in accordance with the operation schedule, departs the departure point P1, picks up the second user U2 at the getting-on point P2, picks up the fourth user U4 at the getting-on point P4, picks up the fifth user U5 at the getting-on point P5, and is headed to the destination point Pg. The mobile terminal 61 of the first user U1 or in-vehicle equipment of the vehicle 90 transmits vehicle position information CP_i including a current position of the vehicle 90 to the ride-share support system 1 as needed.

The ride-share support system 1 transmits ride-share operation information RN_i indicating a ride-share operation status to the mobile terminals 61, 62, 64 and 65 of the first user U1, the second user U2, the fourth user U4 and the fifth user U5 who are ride-sharers of the vehicle 90. The ride-share operation information RN_i includes information such as a current position of the vehicle 90, a notification of arrival at the getting-on point, and a notification of arrival at the getting-off point. The mobile terminals 61, 62, 64 and 65 display a guide screen indicating the operation status of the vehicle 90 at a display unit based on the ride-share operation information RN_i.

Here, the departure point P1 is located within the private area Ar1 of the first user U1, and the getting-on point P2 is located within the private area Ar2 of the second user U2. Therefore, when information of a traveling position of the vehicle 90 within the private area Ar1 including the departure point P1 is displayed at the display units of the mobile terminal 62 of the second user U2, the mobile terminal 64 of the fourth user U4 and the mobile terminal 65 of the fifth user U5 other than the first user U1, there is a possibility that location information of the home 51 of the first user U1 may be known to the second user U2, the fourth user U4 and the fifth user U5.

In a similar manner, also concerning the getting-on point P2, if information of a traveling position of the vehicle 90 within the private area Ar2 including the getting-on point P2 is displayed at the display units of the mobile terminal 64 of the fourth user U4 and the mobile terminal 65 of the fifth user U5 other than the second user U2 and the first user U1 who is a driver, there is a possibility that information of an area in which the home 52 of the second user U2 is located may be known to the fourth user U4 and the fifth user U5.

Therefore, the ride-share support system 1 prohibits transmission of information of the vehicle position to the mobile terminal 62 of the second user U2, the mobile terminal 64 of the fourth user U4 and the mobile terminal 65 of the fifth user U5 with the ride-share operation information RN_i while the vehicle 90 is traveling within the private area Ar1 of the first user U1. By this means, display of a location of a vicinity of the home 51 of the first user U1 at the display units of the mobile terminal 62 of the second user U2, the mobile terminal 64 of the fourth user U4 and the mobile terminal 65 of the fifth user U5 is avoided.

In a similar manner, the ride-share support system 1 prohibits transmission of information of the vehicle position to the mobile terminal 64 of the fourth user U4 and the mobile terminal 65 of the fifth user U5 with the ride-share operation information RN_i while the vehicle 90 is traveling within the private area Ar2 of the second user U2. By this means, display of a location of a vicinity of the home 52 of the second user U2 at the display units of the mobile terminal 64 of the fourth user U4 and the mobile terminal 65 of the fifth user U5 is avoided.

2. Configuration of Ride-Share Support System

A configuration of the ride-share support system 1 will be described with reference to FIG. 2 while the configuration is adapted to the aspect in FIG. 1. The ride-share support system 1 is a computer system including a CPU 10, a memory 30, a communication unit 40, or the like. The communication unit 40 is a communication interface for performing communication with the mobile terminals 61 to 65 to be respectively used by the first user U1 to the fifth user U5 and an in-vehicle apparatus 91 of the vehicle 90 via the communication network 500.

In the memory 30, a control program 31 of the ride-share support system 1, the user DB 32, and the reservation DB 33 are stored. The CPU 10 functions as a user registering unit 11, a reservation managing unit 12, a getting-on/getting-off point information acquiring unit 13, a getting-on/getting-off point distance calculating unit 14, a ride-share matching unit 15, a vehicle position recognizing unit 16, a vehicle position information providing unit 17 and a vehicle position notification prohibiting unit 13 by reading and executing the control program 31 stored in the memory 30.

Processing to be executed by the getting-on/getting-off point information acquiring unit 13 corresponds to a getting-on/getting-off point information acquiring step in a ride-share support method of the present invention, and processing to be executed by the getting-on/getting-off point distance calculating unit 14 corresponds to a getting-on/getting-off point distance calculating step in the ride-share support method of the present invention. Further, processing to be executed by the ride-share matching unit 15 corresponds to a ride-share matching step in the ride-share support method of the present invention.

The user registering unit 11 registers the first user U1 to the fifth user U5 in the ride-share support system 1 based on registration application information transmitted from the mobile terminals 61 to 65 of the first user U1 to the fifth user U5 and stores personal information, or the like, of the first user U1 to the fifth user U5 in the user DB 32. The reservation managing unit 12 accepts reservation application of ride-share by receiving reservation application information RS_r (see FIG. 1) transmitted from the mobile terminals 61 to 65 and transmits reservation acceptance/denial notifications which make notifications of acceptance/denial of the reservations to the mobile terminals 61 to 65.

The getting-on/getting-off point information acquiring unit 13 confirms the getting-on points and the getting-off points at which the first user U1 to the fifth user U5 desire to get on/off the vehicle based on the reservation application information RS_r. The getting-on/getting-off point distance calculating unit 14 calculates the distance between getting-on/getting-off points M for the getting-on points or the getting-off points of the first user U1 to the fifth user U5. The ride-share matching unit 15 determines a ride-share group of the vehicle 90 by performing matching while avoiding combination of users who desire the getting-on points or the getting-off points which satisfy the above-described condition 1 and condition 2. As described above, in the example in FIG. 1, a ride-share group SG1 including the first user U1, the second user U2, the fourth user U4 and the fifth user U5 is determined.

The vehicle position recognizing unit 16 recognizes a current position of the vehicle 90 based on vehicle position information CP_i (see FIG. 1) transmitted from the in-vehicle apparatus 9.1 or the mobile terminal 61 of the first user U1 who is a driver of the vehicle 90. The in-vehicle apparatus 91 and the mobile terminal 61 transmit the vehicle position information CP_i including the current position of the vehicle 90 detected using a GPS (Global Positioning System) sensor, or the like, which is not illustrated, to the ride-share support system 1 as needed.

When ride-share using the vehicle 90 is operated, the vehicle position information providing unit 17 transmits, as needed, ride-share operation information RN_i (see FIG. 1) including the current position of the vehicle 90 recognized by the vehicle position recognizing unit 16 to the mobile terminals 61, 62, 64 and 65 of the first, user U1, the second user U2, the fourth user U4 and the fifth user U5 which are ride-sharers included in the ride-share group SG1. The mobile terminals 61, 62, 64 and 65 which have received the ride-share operation information RN_i respectively display a guide screen indicating the current position of the vehicle 90, arrival of the vehicle 90 at the getting-on point, or the like, at display units 61a, 62a, 64a and 65a.

The vehicle position notification prohibiting unit 18 prohibits transmission of information of the vehicle position in transmission of the ride-share operation information RN_i by the vehicle position information providing unit 17 in a case where the getting-on point of one of the ride-sharers of the vehicle 90 is located within the private area of the ride-sharer, while the vehicle 90 is traveling within the private area in which the getting-on point is located. By this means, notification of the location information of the private area to the mobile terminals 61, 62, 64 and 65 is prohibited.

3. Ride-Share Reservation Processing

Ride-share reservation processing to be executed by the mobile terminals 61 to 65 of the first user U1 to the fifth user U5 will be described with reference to FIG. 3. Here, the first user U1 to the fifth user U5 will be collectively referred to as a user U, and the mobile terminals 61 to 65 will be collectively referred to as a mobile terminal 60. Further, the display units 61a to 65a will be collectively referred to as a display unit 60a.

Figure 3:
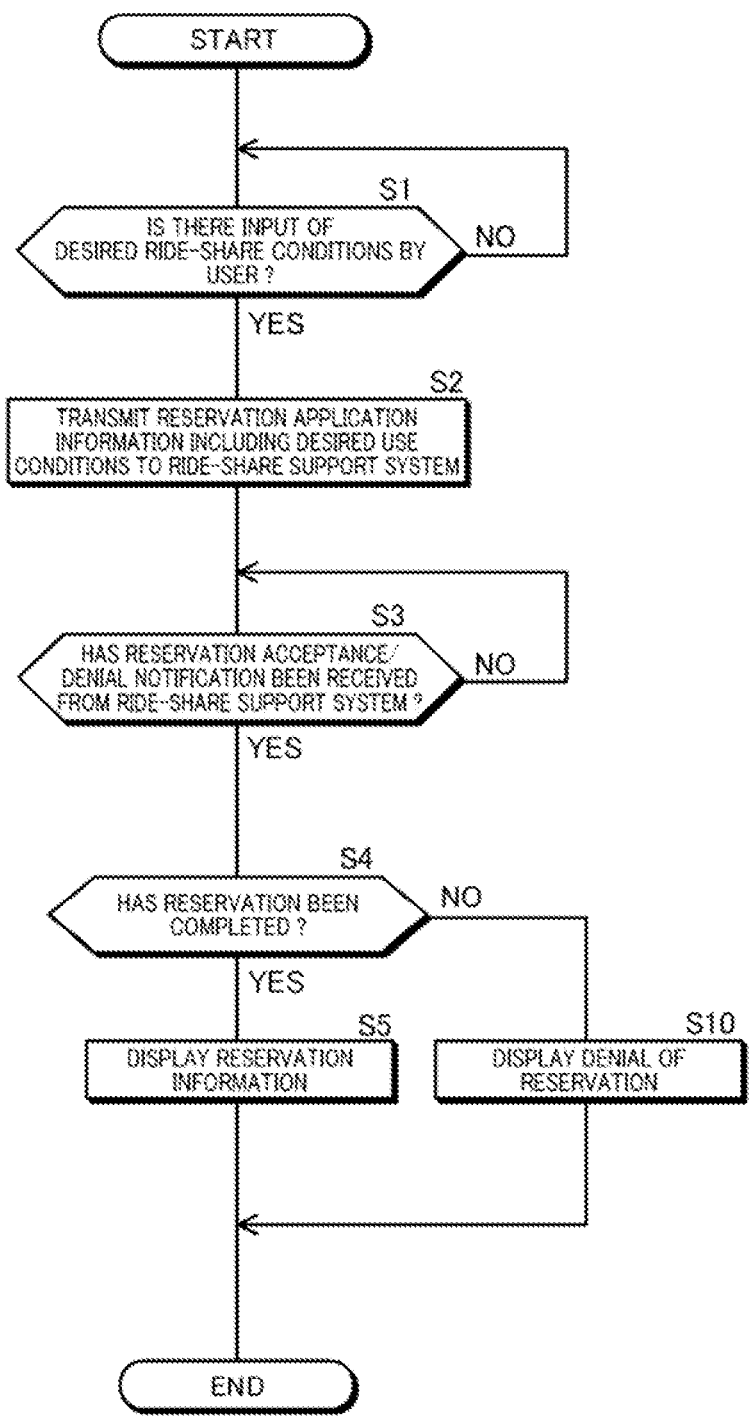
FIG. 3 is a flowchart of ride-share reservation processing at a ride-share applicant terminal.

The mobile terminal 60 performs ride-share reservation processing along the flowchart in FIG. 3 by executing ride-share support application (application program) provided from the ride-share support system 1. In step S1 in FIG. 3, when the mobile terminal 60 receives input of desired use conditions from the user U, the processing proceeds to step S2.

In step S2, the mobile terminal 60 transmits reservation application information RS_r (see FIG. 1) including the desired use conditions to the ride-share support system 1. As described above, the reservation application information RS_r includes information of a role, a departure place, a destination, date and time of departure and a location of a home. In the ride-share support system 1 which has received the reservation application information RS_r, matching of ride-share is performed by the ride-share matching unit 15, and whether the reservation of ride-share is accepted or denied is determined in accordance with a matching result. Then, a reservation acceptance/denial notification which makes a notification of acceptance/denial of the reservation is transmitted to the mobile terminal 60 from the ride-share support system 1.

When the mobile terminal 60 receives the reservation acceptance/denial notification from the ride-share support system 1 in step S3, the processing proceeds to step S4. In step S4, when the mobile terminal 60 recognizes from the reservation acceptance/denial notification that reservation of ride-share has been completed, the processing proceeds to step S5, and the mobile terminal 60 displays reservation information at the display unit 60a.

Meanwhile, when the mobile terminal 60 recognizes from the reservation acceptance/denial notification that the reservation of ride-share has been failed, the processing proceeds from step S4 to step S10, and the mobile terminal 60 displays failure of the reservation at the display unit 60a.

4. Ride-Share Matching Processing

Ride-share matching processing to be executed by the ride-share support system 1 will be described in accordance with a flowchart illustrated in FIG. 4 while the ride-share matching processing is adapted to the above-described example in FIG. 1.

Figure 4:
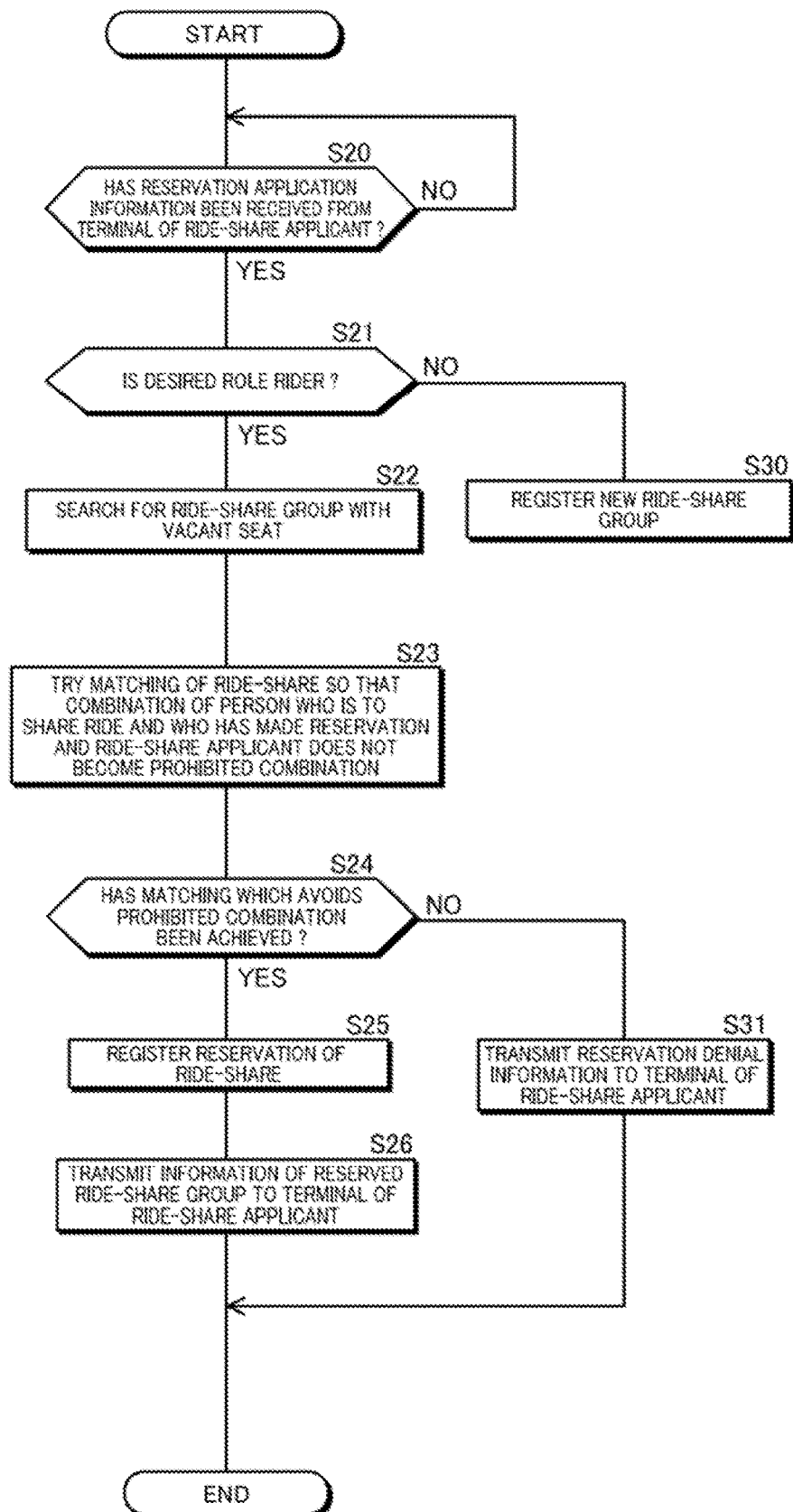
FIG. 4 is a flowchart of ride-share matching processing in the ride-share support system.

In step S20 in FIG. 4, when the reservation managing unit 12 receives reservation application information RS_r transmitted from one of the mobile terminals 61 to 65 of the first user U1 to the fifth user U5, the reservation managing unit 12 records content of the reservation application information RS_r in the reservation DB 33, and the processing proceeds to step S21. In the example in FIG. 1, as indicated in the reservation application list 100 in FIG. 5, desired use conditions of the first user U1 to the fifth user U5 are recorded in the reservation DB 33. In the reservation application list 100, locations of homes, roles, departure places, destinations, date and time of departure and the determined ride-share group for respective user IDs issued for the first user U1 to the fifth user 135 are recorded.

In step S21, when a driver is designated as a role in the desired use conditions recognized from the reservation application information RS_r, the processing proceeds to step S30, and the reservation managing unit 12 registers a new ride-share group and records the ride-share group in the reservation DR 33. In the example in FIG. 1, a new ride-share group is registered for the first user U1 who designates a driver as a role.

Meanwhile, when a rider is not designated as a role in the desired use conditions, the reservation managing unit 12 proceeds with the processing from step S21 to step S22. The processing from step S22 to step S23 is processing to be performed by the ride-share matching unit 15. The ride-share matching unit 15 searches for a ride-share group which suits the desired ride-share conditions among ride-share groups with vacant seats in step S22.

In the subsequent step S23, the ride-share matching unit 15 calculates the distance between getting-on/getting-off points M by the getting-on/getting-off point distance calculating unit 14 for a getting-on point or a getting-off point of a person who is to share a ride acquired by the getting-on/getting-off point information acquiring unit 13 and a getting-on point or a getting-off point of the ride-share applicant. Then, the ride-share matching unit 15 tries matching of ride-share so that combination of the person who is to share a ride who has made a reservation and the ride-share applicant who applies a reservation does not become prohibited combination which satisfies the above-described condition 1 and condition 2.

In the above-described example in FIG. 1, a ride-share group SG1 including the first user U1, the second user U2, the fourth user U4 and the fifth user U5, from which the third user U3 is excluded is determined through ride-share matching to avoid combination of the second user U2 and the third user U3 which is prohibited combination.

In the next step S24, when ride-share matching which avoids prohibited combination is achieved by the ride-share matching unit 15, the processing proceeds to step S25, and the reservation managing unit 12 registers the reservation of ride-share in the reservation DB 33. Then, in the subsequent step S26, the reservation managing unit 12 transmits ride-share reservation information including a ride-share operation schedule to mobile terminals of persons who are to share a ride of the ride-share group, who have completed the reservations.

In the example in FIG. 1, the ride-share reservation information is transmitted to the mobile terminals 61, 62, 64 and 65 of the first user U1, the second user U2, the fourth user U4 and the fifth user U5 who are persons who are to share a ride in the ride-share group SG1. FIG. 6 illustrates the ride-share operation schedule 110 using the vehicle 90 illustrated in FIG. 1, and illustrates scheduled time of departure of the vehicle 90 from the departure point P1, scheduled time of arrival at P2, P4 and P5 which are pick-up points, and scheduled time of arrival at the destination point Pg. Further, users who are to get on the vehicle at the respective getting-on points are illustrated.

Meanwhile, when ride-share matching by the ride-share matching unit 15 is not achieved, the processing proceeds from step S24 to step S31, and the reservation managing unit 12 transmits reservation denial information which makes a notification that the reservation has been failed to a mobile terminal of a ride-share applicant. In the example in FIG. 1, the reservation denial information is transmitted to the mobile terminal 63 of the third user U3. The third user U3 can recognize that the reservation has been failed by confirming the reservation denial information displayed at the display unit 63a of the mobile terminal 63 and can take measures such as transmission of reservation application information Rs_r in which the desired use conditions have been changed.

5. Operation Support Processing

Operation support processing to be executed by the vehicle position information providing unit 17 and the vehicle position notification prohibiting unit 18 will be described in accordance with flowcharts illustrated in FIG. 7 and FIG. 8.

In step S50 in FIG. 1, when it is time of departure recognized from the ride-share operation schedule 110, the processing proceeds to step S51, and the vehicle position information providing unit 17 starts transmission of vehicle position information to the mobile terminal 61 of the first user U1 with the ride-share operation information (see FIG. 1). By this means, a guide screen indicating a current position, or the like, of the vehicle 90 is displayed at the display unit 61a of the mobile terminal 61.

Note that transmission of the ride-share operation information RN_i which does not include current position information of the vehicle 90 to the mobile terminals 62, 64 and 65 of the second user U2, the fourth user U4 and the fifth user U5 is started, and the mobile terminals 62, 64 and 65 display a guide screen which makes a notification of start of ride-share operation at the display units.

In the subsequent step S52, the vehicle position notification prohibiting unit 18 proceeds with processing to step S53 after the position of the vehicle 90 recognized by the vehicle position recognizing unit 16 exits from the private area Ar1 of the first user U1. Through the processing in step 352, while the vehicle 90 is traveling within the private area Ar1 of the first user U1, transmission of the ride-share operation information to the mobile terminals 62, 64 and 65 of the second user U2, the fourth user U4 and the fifth user U5 is prohibited.

By this means, it is possible to prevent a location of the private area Ar1 in which the home 51 of the first user U1 is located from being known to other ride-sharers as a result of the location of the private area Ar1 of the first user U1 being displayed at the mobile terminals 62, 64 and 65 of the second user U2, the fourth user U4 and the fifth user U5.

In step S53, the vehicle position information providing unit 17 starts transmission of the ride-share operation information RN_i including the current position information of the vehicle 90 to the mobile terminals 62, 64 and 65 of the second user U2, the fourth user U4 and the fifth user U5. In the subsequent step S54, when the vehicle position notification prohibiting unit 18 recognizes that the position of the vehicle 90 recognized by the vehicle position recognizing unit 16 enters the private area Ar2 of the second user U2, the processing proceeds to step S55. Then, in step S55, the vehicle position notification prohibiting unit 18 interrupts transmission of the vehicle position information to the mobile terminals 64 and 65 of the fourth user U4 and the fifth user U5 with the ride-share operation information RN_i.

By this means, display of the current, position (position within the private area Ar2) of the vehicle 90 at the mobile terminals 64 and 65 of the fourth user U4 and the fifth user U5 is prohibited, and only a notification of arrival at the getting-on point P2 is displayed. It is thereby possible to prevent the location of the private area Ar2 in which the home 52 of the second user U2 is located from being known to the fourth user U4 and the fifth user U5.

In the subsequent step S56, when the vehicle position information providing unit 17 recognizes completion of the second user U2 getting on the vehicle 90, the processing proceeds to step S57, and the vehicle position information providing unit 17 finishes transmission of the vehicle position information to the mobile terminal 62 of the second user U2 with the ride-share operation information RN_i.

Figure 8:
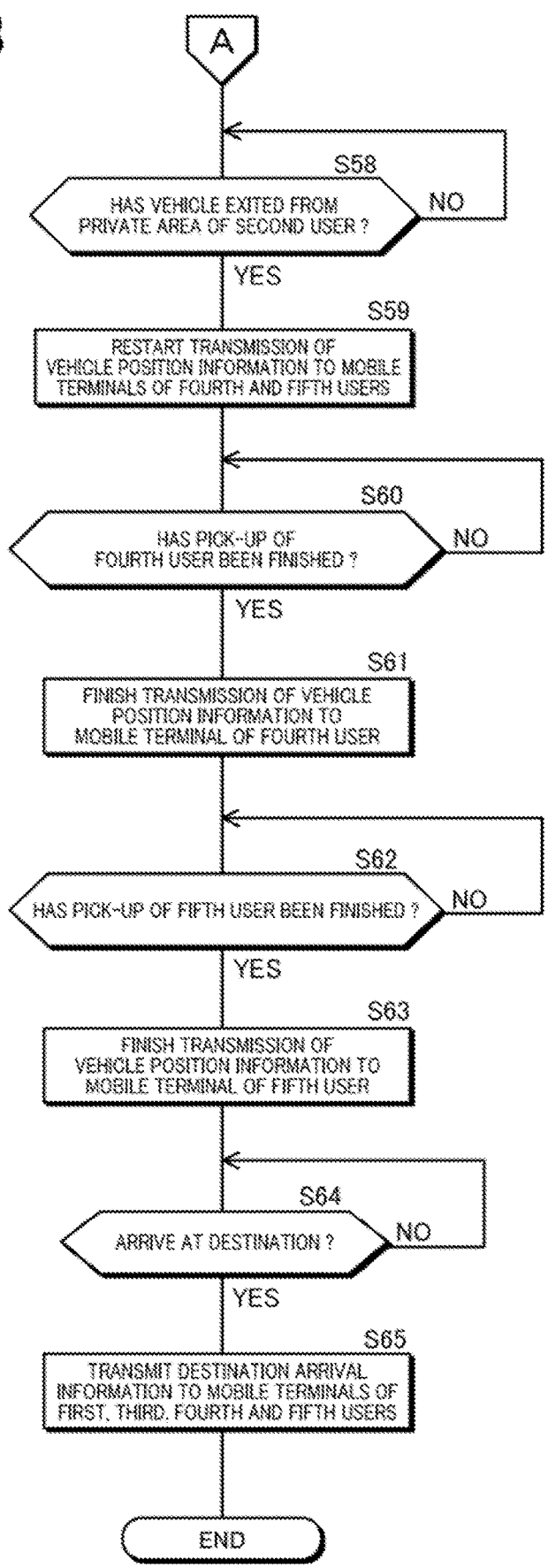
FIG. 8 is a second flowchart of the operation support processing by the ride-share support system.

In the subsequent step S58 in FIG. 8, when the vehicle position information providing unit 17 recognizes that the current position of the vehicle 90 recognized by the vehicle position recognizing unit 16 exits from the private area Ar2 of the second user U2, the processing proceeds to step S59. Then, in step S59, the vehicle position information providing unit 17 restarts transmission of the vehicle position information to the mobile terminals 64 and 65 of the fourth user U4 and the fifth user U5 with the ride-share operation information RN_i. By this means, display of the current position of the vehicle 90 at the mobile terminals 64 and 65 is restarted.

In the next step S60, when the vehicle position information providing unit 17 recognizes completion of the fourth user U4 getting on the vehicle 90, the processing proceeds to step S61. Then, in step S61, the vehicle position information providing unit 17 finishes transmission of the vehicle position information to the mobile terminal 64 of the fourth user U4 with the ride-share operation information RN_i.

In the subsequent step S62, when the vehicle position information providing unit 27 recognizes completion of the fifth user U5 getting on the vehicle 90, the processing proceeds to step S63. Then, in step S63, the vehicle position information providing unit 17 finishes transmission of the vehicle position information to the mobile terminal 65 of the fifth user U5 with the ride-share operation information RN_i.

In the subsequent step S64, when the vehicle position information providing unit 17 recognizes arrival of the vehicle 90 at the destination point Pg from the current position of the vehicle 90 recognized by the vehicle position recognizing unit 16, the processing proceeds to step S65. Then, in step S65, the vehicle position information providing unit 17 transmits destination arrival information which makes a notification of arrival at the destination point Pg to the mobile terminals 61, 62, 64 and 65 of the first user VI, the second user U2, the fourth user U4 and the fifth user U5.

Figure 7:
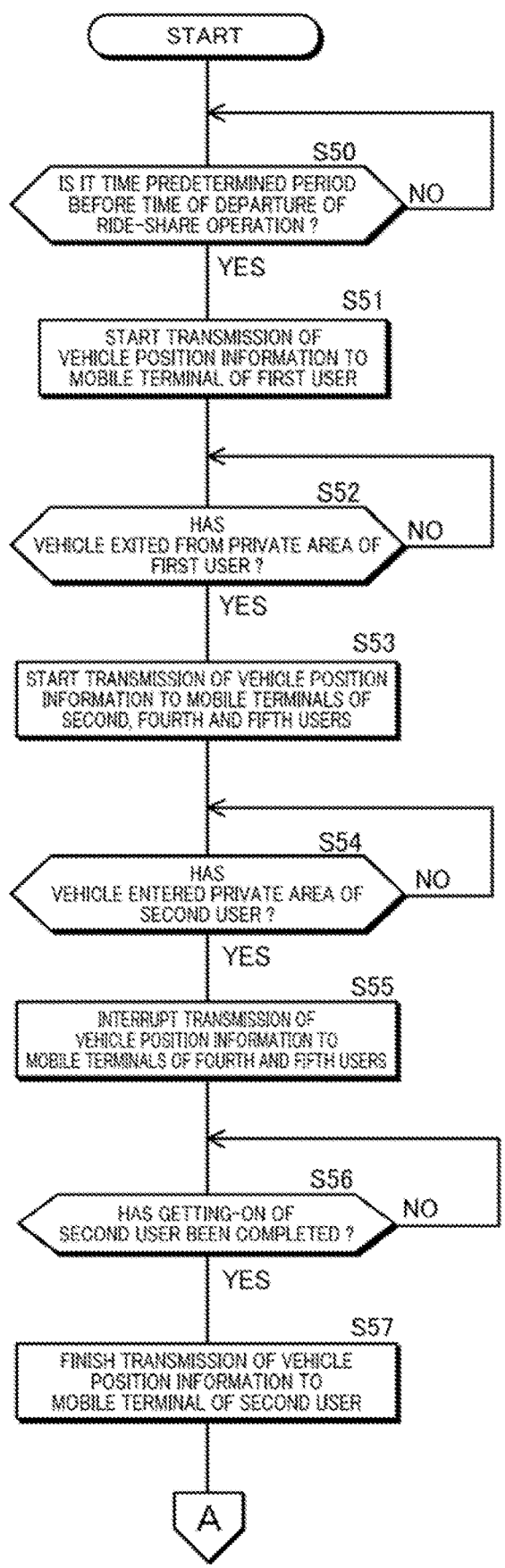
FIG. 7 is a first flowchart of operation support processing by the ride-share support system.

Through the operation support processing in FIG. 7 to FIG. 8, in the operation route Rt of the vehicle 90 illustrated in FIG. 1, while the vehicle 90 is traveling in the private area Ar1 of the first user U1, transmission of the vehicle position information to the mobile terminals 62, 64 and 65 of the second user U2, the fourth user U4 and the fifth user U5 is prohibited. Further, while the vehicle 90 is traveling in the private area Ar2 of the second user U2, transmission of the vehicle position information to the fourth user U4 and the fifth user U5 is prohibited.

By this means, information of an area in which the home 51 of the first user U1 is located is prevented from being known to other ride-sharers, and information of an area in which the home 52 of the second user U2 is located is prevented from being known to other ride-sharers other than the first user U1 who is a driver.

6. Other Embodiments

While, in the above-described embodiment, the ride-share matching unit 15 handles combination of ride-share applicants, which satisfies the above-described condition 1 and condition 2 as prohibited combination, the ride-share matching unit 15 may handle combination of ride-share applicants, which satisfies the condition 0.1 as prohibited combination without making judgement as to the condition 2.

While, in the above-described embodiment, the private areas Ar1 to Ar5 centering around the homes 51 to 55 of the first user U1 to the fifth user U5 are set, the private areas are not limited to these. For example, an area including a location or a facility such as an office, a school and a hospital of a user, which the user does not want others to know can be set as the private area.

In the above-described embodiment, while the vehicle 90 is traveling within a private area of one ride-sharer, the vehicle position notification prohibiting unit 18 avoids other ride-sharers from being notified of information of the private area of one of the ride-sharers by prohibiting transmission of vehicle position information to mobile terminals of other ride-sharers other than a driver by the vehicle position information providing unit 17. As another embodiment, it is also possible to avoid other ride-sharers from being notified of information of a private area of one of the ride-sharers by transmitting information which prohibits display of a position within the private area to mobile terminals of other ride-sharers.

In the above-described embodiment, the vehicle position information providing unit 17 is provided, and the vehicle position information providing unit 17 transmits the vehicle position information to the mobile terminals 61, 62, 64 and 65 of the first user U1, the second user U2, the fourth user UA and the fifth user U5 which are ride-sharers of the vehicle 90. As another embodiment, it is also possible to omit the vehicle position information providing unit 17 and configure the ride-share support system which performs operation to ride-share matching. Further, while the vehicle position notification prohibiting unit 13 is provided and processing of prohibiting transmission of the vehicle position information by the vehicle position information providing unit 17 is performed by the vehicle position notification prohibiting unit 18, the vehicle position notification prohibiting unit 18 may be omitted.

In the above-described embodiment, a case has been described where ride-share matching processing is performed for the first user U1 who provides transport using the vehicle 90, and the second user U2 to the fifth user U5 who desire to get on the vehicle 90. In FIG. 1, also in a case where a plurality of users who go home from factory Y of company X 300 get on the vehicle 90 at Pg which is the departure place and sequentially get off the vehicle 90 at getting-off points on the way to P1 which is the destination through ride-share, it is possible to prevent location information of a private area of one of ride-sharers from being known to other ride-sharers by performing similar matching processing. In this case, the ride-share matching unit 15 determines a ride-share group while avoiding combination of users for whom a distance between the getting-off points desired by the respective users becomes equal to or less than the predetermined distance Mth.

Further, in a case where users who get on the vehicle 90 and users who get off the vehicle 90 during ride-share are mixed, the ride-share matching unit 15 determines a ride-share group while also avoiding combination of users for whom a distance between the getting-on point and the getting-off point becomes equal to or less than the predetermined distance Mth.

Figure 2:
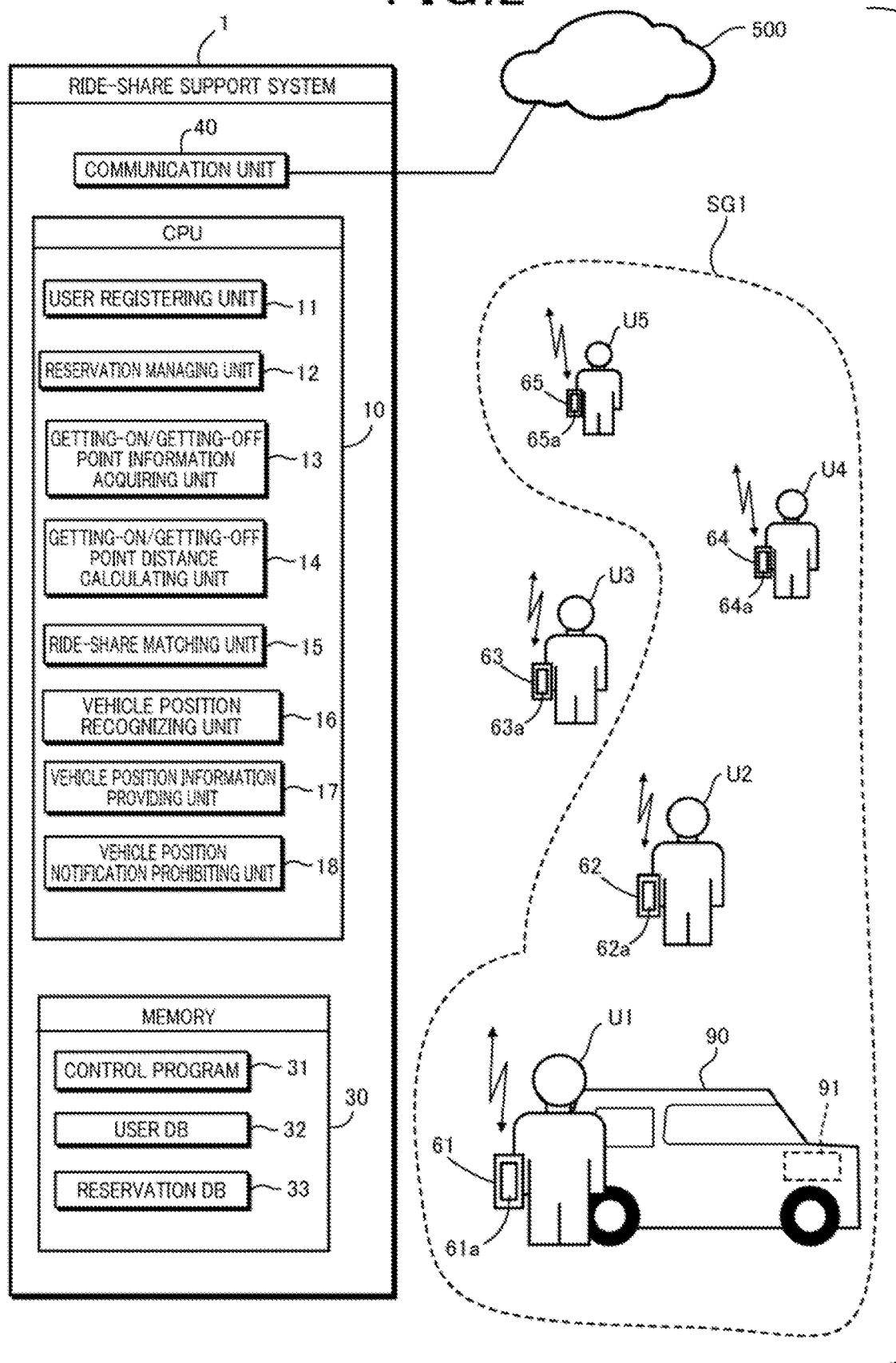
FIG. 2 is an explanatory diagram of a configuration of the ride-share support system.

Note that while FIG. 2 is a schematic diagram illustrating a functional configuration of the ride-share support system 1, which is segmented by principle processing to facilitate understanding of the present invention, the configuration of the ride-share support system 1 may be constituted with other segments. Further, processing of respective components may be executed by one hardware unit or may be executed by a plurality of hardware units. Further, processing of the respective components illustrated in FIG. 7 and FIG. 3 may be executed with one program or may be executed with a plurality of programs.

7. Configurations Supported by the Above-Described Embodiment

The above-described embodiment is a specific example of the following configurations.
(First Section)

A ride-share support system which supports matching of a plurality of ride-share applicants who desire ride-share of a vehicle, the ride-share support system including a getting-on/getting-off point information acquiring unit configured to acquire first getting-on/getting-off point information including information of at least one of a getting-on point and a getting-off point in the ride-share of a first ride-share applicant transmitted from a first applicant terminal to be used by the first ride-share applicant, and second getting-on/getting-off point information including information of at least one of a getting-on point and a getting-off point in the ride-share of a second ride-share applicant transmitted from a second applicant terminal to be used by the second ride-share applicant, for the first ride-share applicant and the second ride-share applicant who are each one of a plurality of ride-share applicants, a getting-on/getting-off point distance calculating unit configured to calculate a distance between getting-on/getting-off points which is a distance between the getting-on point, or the getting-off point in the ride-share of the first ride-share applicant and the getting-on point or the getting-off point in the ride-share of the second ride-share applicant based on the first getting-on/getting-off point information and the second getting-on/getting-off point information, and a ride-share matching unit configured to determine ride-sharers of the vehicle by matching a plurality of the ride-share applicants while excluding combination of the first ride share applicant and the second ride-share applicant in a case where the distance between getting-on/getting-off points is equal to or less than a predetermined distance.

In the ride-share support system in the first section, it is assumed that the first ride-share applicant and the second ride-share applicant set getting-on points and getting-off points of the first getting-on/getting-off point information and the second getting-on/getting-off point information within private areas such as vicinities of homes in consideration of reduction of their burden in moving by foot, or the like Therefore, if a distance between the getting-on point or the getting-off point of the first ride-share applicant and the getting-on point or the getting-off point of the second ride-share applicant is short, the getting-on points or the getting-off points of both of the first ride-share applicant and the second ride-share applicant are highly likely to be set within overlapping private areas of the first ride-share applicant and the second ride-share applicant.

Further, in a case where the getting-on points or the getting-off points of both of the first ride-share applicant and the second ride-share applicant are set within the overlapping private areas of the first ride-share applicant and the second ride-share applicant in this manner, there is a possibility that, when the first ride-share applicant recognizes the second ride-share applicant who gets on or gets off the vehicle within the private area of the first ride-share applicant, with which the first ride-share applicant is familiar, location information of the private area of the second ride-share applicant may be known to the first ride-share applicant. In a similar manner, there is a possibility that, when the second ride-share applicant recognizes the first ride-share applicant who gets on or gets off the vehicle within the private area of the second ride-share applicant, with which the second ride-share applicant is familiar, location information of the private area of the first ride-share applicant may be known to the second ride-share applicant.

Therefore, the ride-share support system in the first section excludes the first ride-share applicant and the second ride-share applicant, who desire ride-share of the vehicle from combination of matching by the ride-share matching unit in a case where the distance between getting-on points or the getting-off points is equal to or less than the predetermined distance. By this means, it is possible to prevent location information of a private area of a ride-sharer from being known to other ride-sharers as a result of the first ride-share applicant and the second ride-share applicant whose getting-on points or getting-off points of the vehicle for ride-share are close to each other being matched.

(Second Section)

The ride-share support system according to the first section, in which the ride-share matching unit matches a plurality of the ride-share applicants without excluding combination of the first ride-share applicant and the second ride-share applicant even if the distance between getting-on/getting-off points is equal to or less than the predetermined distance, in a case where none of the getting-on point or the getting-off point in the ride-share of the first ride-share applicant and the getting-on point or the getting-off point in the ride-share of the second ride-share applicant, which are used to calculate the distance between getting-on/getting-off points, is located within a private area of the first ride-share applicant or the second ride-share applicant.

According to the ride-share support system according to the second section, in a case where the getting-on point or the getting-off point of the first ride-share applicant and the second ride-share applicant is not located within the private area, by performing matching of ride-share without excluding combination of the first ride-share applicant and the second ride-share applicant, it is possible to increase the potential of matching.

(Third Section)

The ride-share support system according to the first section or the second section, further including a vehicle position recognizing unit configured to recognize a position of the vehicle, and a vehicle position information providing unit configured to transmit vehicle position information indicating the position of the vehicle recognized by the vehicle position recognizing unit to ride-sharer terminals to be used by the ride-sharers of the vehicle matched by the ride-share matching unit.

According to the ride-share support system according to the third section, it is possible to enable confirmation of the position of the vehicle at ride-sharer terminals, so that it is possible to support utilization of the vehicle by the ride-sharers.

(Fourth Section)

The ride-share support system according to the third section, further including a vehicle position notification prohibiting unit configured to prohibit notification of the position of the vehicle based on the vehicle position information at the ride-sharer terminals of other ride-sharers when the position of the vehicle recognized by the vehicle position recognizing unit is located within a private area of one of a plurality of the ride-sharers.

According to the ride-share support system according to the fourth section, it is possible to prevent a location of a private area of one of the ride-sharers from being known to other ride-sharers.

(Fifth Section)

The ride-share support system according to any one of the first section to the fourth section, in which an area in which at least one of a home, an office, a school and a hospital of the ride-share applicant is located is set as the private area of the ride-share applicant.

According to the ride-share support system according to the fifth section, it is possible to prevent a location of an area in which at least one of a home, an office, a school and a hospital is located, which is assumed as an area which the ride-share applicant does not someone to know, from being known to other ride-sharers.

(Sixth Section)

A ride-share support method to be executed by a ride-share support system which supports matching of a plurality of ride-share applicants who desire ride-share of a vehicle, the ride-share support method including a getting-on/getting-off point information acquiring step of acquiring first getting-on/getting-off point information including information of at least one of a getting-on point and a getting-off point in the ride-share of a first ride-share applicant transmitted from a first applicant terminal to be used by the first ride-share applicant, and second getting-on/getting-off point information including information of at least one of a getting-on point and a getting-off point in the ride-share of a second ride-share applicant transmitted from a second applicant terminal to be used by the second ride-share applicant, for the first ride-share applicant and the second ride-share applicant who are each one of a plurality of ride-share applicants, a getting-on/getting-off point distance calculating step of calculating a distance between getting-on/getting-off points which is a distance between the getting-on point or the getting-off point in the ride-share of the first ride-share applicant and the getting-on point or the getting-off point in the ride-share of the second ride-share applicant based on the first getting-on/getting-off point information and the second getting-on/getting-off point information, and a ride-share matching step of determining ride-sharers of the vehicle by matching a plurality of the ride-share applicants while excluding combination of the first ride-share applicant and the second ride-share applicant in a case where the distance between getting-on/getting-off points is equal to or less than a predetermined distance.

It is possible to realize a configuration of the ride-share support system according to the above-described first section by the ride-share support method according to the sixth section being executed in the ride-share support system.

REFERENCE SIGNS LIST

1 ride-share support system
10 CPU
11 user registering unit
12 reservation managing unit
13 getting-on/getting-off point information acquiring unit
14 getting-on/getting-off point distance calculating unit
15 ride-share matching unit
16 vehicle position recognizing unit
17 vehicle position information providing unit
18 vehicle position notification prohibiting unit
30 memory
31 control program
32 user DB
33 reservation DB
40 communication unit
51 to 55 homes of users
61 to 65 mobile terminals 61a to 65a display units of mobile terminals
90 vehicle
91 in-vehicle apparatus
100 reservation application list
110 ride-share operation schedule
Ar1 to Ar5 private areas
U1 to U5 users

What is claimed is:

1. A ride-share support system which supports matching of a plurality of ride-share applicants who desire ride-share of a vehicle, the ride-share support system comprising a CPU, wherein the CPU:
communicates with mobile terminals used by each of the plurality of ride-share applicants and an in-vehicle apparatus of the vehicle via a communication network;
acquires first getting-on/getting-off point information including information of at least one of a getting-on point and a getting-off point in the ride-share of a first ride-share applicant transmitted from a first applicant terminal to be used by the first ride-share applicant, and second getting-on/getting-off point information including information of at least one of a getting-on point and a getting-off point in the ride-share of a second ride-share applicant transmitted from a second applicant terminal to be used by the second ride-share applicant, for the first ride-share applicant and the second ride-share applicant who are each one of a plurality of ride-share applicants;
calculates a distance between getting-on/getting-off points which is a distance between the getting-on point or the getting-off point in the ride-share of the first ride-share applicant and the getting-on point or the getting-off point in the ride-share of the second ride-share applicant based on the first getting-on/getting-off point information and the second getting-on/getting-off point information; and
determines ride-sharers of the vehicle by matching a plurality of the ride-share applicants while excluding combination of the first ride-share applicant and the second ride-share applicant in a case where the distance between getting-on/getting-off points is equal to or less than a predetermined distance, in a case where either one of the getting-on point or the getting-off point in the ride-share of the first ride-share applicant and the getting-on point or the getting-off point in the ride-share of the second ride-share applicant, which are used to calculate the distance between getting-on/getting-off points, is located within a private area of the first ride-share applicant or the second ride-share applicant, and without excluding combination of the first ride-share applicant and the second ride-share applicant even if the distance between getting-on/getting-off points is equal to or less than the predetermined distance, in a case where none of the getting-on point or the getting-off point in the ride-share of the first ride-share applicant and the getting-on point or the getting-off point in the ride-share of the second ride-share applicant, which are used to calculate the distance between getting-on/getting-off points, is located within a private area of the first ride-share applicant or the second ride-share applicant.

2. The ride-share support system according to claim 1, wherein the CPU further:
recognizes a vehicle position information including a current position of the vehicle based on vehicle position information transmitted from the in-vehicle apparatus; and
transmits the vehicle position information indicating the position of the vehicle to the mobile terminals to be used by the ride-sharers of the vehicle matched.

3. The ride-share support system according to claim 2, wherein the CPU further:
prohibits notification of the position of the vehicle based on the vehicle position information at the mobile terminals of other ride-sharers when the position of the vehicle is located within a private area of one of a plurality of the ride-sharers.

4. The ride-share support system according to claim 1, wherein an area in which at least one of a home, an office, a school and a hospital of the ride-share applicant is located is set as a private area of the ride-share applicant.

5. A ride-share support method to be executed by a ride-share support system which supports matching of a plurality of ride-share applicants who desire ride-share of a vehicle, the ride-share support method comprising:
a step of communicating with mobile terminals used by each of the plurality of the ride-share applicants and an in-vehicle apparatus of the vehicle via a communication network;
a getting-on/getting-off point information acquiring step of acquiring first getting-on/getting-off point information including information of at least one of a getting-on point and a getting-off point in the ride-share of a first ride-share applicant transmitted from a first applicant terminal to be used by the first ride-share applicant, and second getting-on/getting-off point information including information of at least one of a getting-on point and a getting-off point in the ride-share of a second ride-share applicant transmitted from a second applicant terminal to be used by the second ride-share applicant, for the first ride-share applicant and the second ride-share applicant who are each one of a plurality of ride-share applicants;
a getting-on/getting-off point distance calculating step of calculating a distance between getting-on/getting-off points which is a distance between the getting-on point or the getting-off point in the ride-share of the first ride-share applicant and the getting-on point or the getting-off point in the ride-share of the second ride-share applicant based on the first getting-on/getting-off point information and the second getting-on/getting-off point information; and
a ride-share matching step of determining ride-sharers of the vehicle by matching a plurality of the ride-share applicants while excluding combination of the first ride-share applicant and the second ride-share applicant in a case where the distance between getting-on/getting-off points is equal to or less than a predetermined distance, in a case where either one of the getting-on point or the getting-off point in the ride-share of the first ride-share applicant and the getting-on point or the getting-off point in the ride-share of the second ride-share applicant, which are used to calculate the distance between getting-on/getting-off points, is located within a private area of the first ride-share applicant or the second ride-share applicant, and without excluding combination of the first ride-share applicant and the second ride-share applicant even if the distance between getting-on/getting-off points is equal to or less than the predetermined distance, in a case where none of the getting-on point or the getting-off point in the ride-share of the first ride-share applicant and the getting-on point or the getting-off point in the ride-share of the second ride-share applicant, which are used to calculate the distance between getting-on/getting-off points, is located within a private area of the first ride-share applicant or the second ride-share applicant.

6. The ride-share support method according to claim 5, further comprising:
   a vehicle position recognizing step of recognizing a vehicle position information including a current position of the vehicle based on vehicle position information transmitted from the in-vehicle apparatus; and
   a vehicle position information providing step of transmitting the vehicle position information indicating the position of the vehicle recognized in the vehicle position recognizing step to the mobile terminals to be used by the ride-sharers of the vehicle matched in the ride-share matching step.

7. The ride-share support method according to claim 6, further comprising:
   a vehicle position notification prohibiting step of prohibiting notification of the position of the vehicle based on the vehicle position information at the mobile terminals of other ride-sharers when the position of the vehicle recognized in the vehicle position recognizing step is located within a private area of one of a plurality of the ride-sharers.

8. The ride-share support method according to claim 5, wherein an area in which at least one of a home, an office, a school and a hospital of the ride-share applicant is located is set as a private area of the ride-share applicant.

\* \* \* \* \*